United States Patent [19]

Storf

[11] Patent Number: 5,238,118

[45] Date of Patent: Aug. 24, 1993

[54] SEPARATOR WITH DISPLACEMENT BODY

[75] Inventor: Robert Storf, Weingarten, Fed. Rep. of Germany

[73] Assignee: Waeschle Maschinenfabrik GmbH, Ravensburg, Fed. Rep. of Germany

[21] Appl. No.: 886,714

[22] Filed: May 21, 1992

[30] Foreign Application Priority Data

May 24, 1991 [DE] Fed. Rep. of Germany ....... 4117001

[51] Int. Cl.$^5$ .............................................. B07B 4/00
[52] U.S. Cl. .............................. 209/139.001; 209/145; 209/149
[58] Field of Search ...................... 209/139.1, 138, 145, 209/149

[56] References Cited

U.S. PATENT DOCUMENTS 2,577,295  12/1951  Ahlmann .............................. 209/149
4,528,092   7/1985  Krambrock et al. ............ 209/139.1

FOREIGN PATENT DOCUMENTS

V 6360  10/1955  Fed. Rep. of Germany ... 209/139.1

Primary Examiner—H. Grant Skaggs
Attorney, Agent, or Firm—Henry M. Feiereisen

[57] ABSTRACT

A separator includes two concentric pipe sections, with the inner pipe section enclosing a displacement body with cone-shaped tip. In order to improve separation of angel hair, the displacement body has evenly spaced circumferential ribs to provide the displacement body with a cross section of star-shaped configuration.

7 Claims, 2 Drawing Sheets

5,238,118

SEPARATOR WITH DISPLACEMENT BODY

BACKGROUND OF THE INVENTION

The invention refers to an apparatus for separating contaminants from a stream of bulk material, and in particular to a separator of the deflection type having a displacement body with cone-shaped tip.

A conventional separator of this type has a first upright pipe section which concentrically encloses the displacement body to define with the latter a first annular space. A second annular space is defined between the first pipe section and a second pipe section which encloses the first pipe section and extends beyond the lower end of the first pipe section for connection with a container in which screened bulk material is collected. The container is provided with an inlet opening for sifting air which passes upwards countercurrently to the descending bulk material introduced at the to of the first pipe section, so as to force lighter components contained in the stream of bulk material through the outer annular space and to exit through an outlet conduit in the upper area of the second pipe section.

Such a separator is especially suitable for removing dust particles and other contaminants of granular bulk material. After flowing through the separator, the residual dust content of the bulk material can be 30 ppm or less.

A major part of dust particles screened in the separator is created as abrasion from the granular material during the preceding pneumatic transport. In certain types of bulk material, the pneumatic transport produces not only dusty abrasions but also other contaminants such as so-called angel hair, i.e. strand-like or hair-like components. Angel hair has a large surface compared to its mass and a substantially smaller settling velocity than granular material. Thus, it may be assumed that angel hair can fairly easily be separated. However, the opposite is true. A reason for the relatively poor degree of separation of angel hair in such conventional separators compared to the separation of dust particles is probably the large surface area of angel hair which, especially when being aligned within the separating zone at a certain angel relative to the flow direction, is struck by subsequent granular particles and forced towards the bottom.

SUMMARY OF THE INVENTION

It is thus an object of the present invention to create a separator obviating the afore-stated drawbacks.

In particular, it is an object of the present invention to create a separator by which the separation of angel hair is considerably improved compared to conventional separators.

These objects and others which will become apparent hereinafter, are attained in accordance with the present invention by providing the displacement body with a cross section of star-shaped configuration.

Preferably, the star-shaped configuration is provided by arranging ribs about the circumference of the displacement body.

The provision of such a star-shaped displacement body produces two functional results. Firstly, angel hair which deposits in the stream of bulk material between the ribs is at least to a major part thereof aligned parallel to the flow direction and thus creates only a small contact surface which can be struck by subsequent granular particles. Secondly, the remaining fraction of angel hair in the bulk material stream is forced or displaced into the circumferential area of the first annular space so that the distance to be travelled by angel hair in radial direction in order to reach the second annular space is considerably shortened and thus the probability of being struck by subsequent granular material during flow along this path is considerably diminished.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
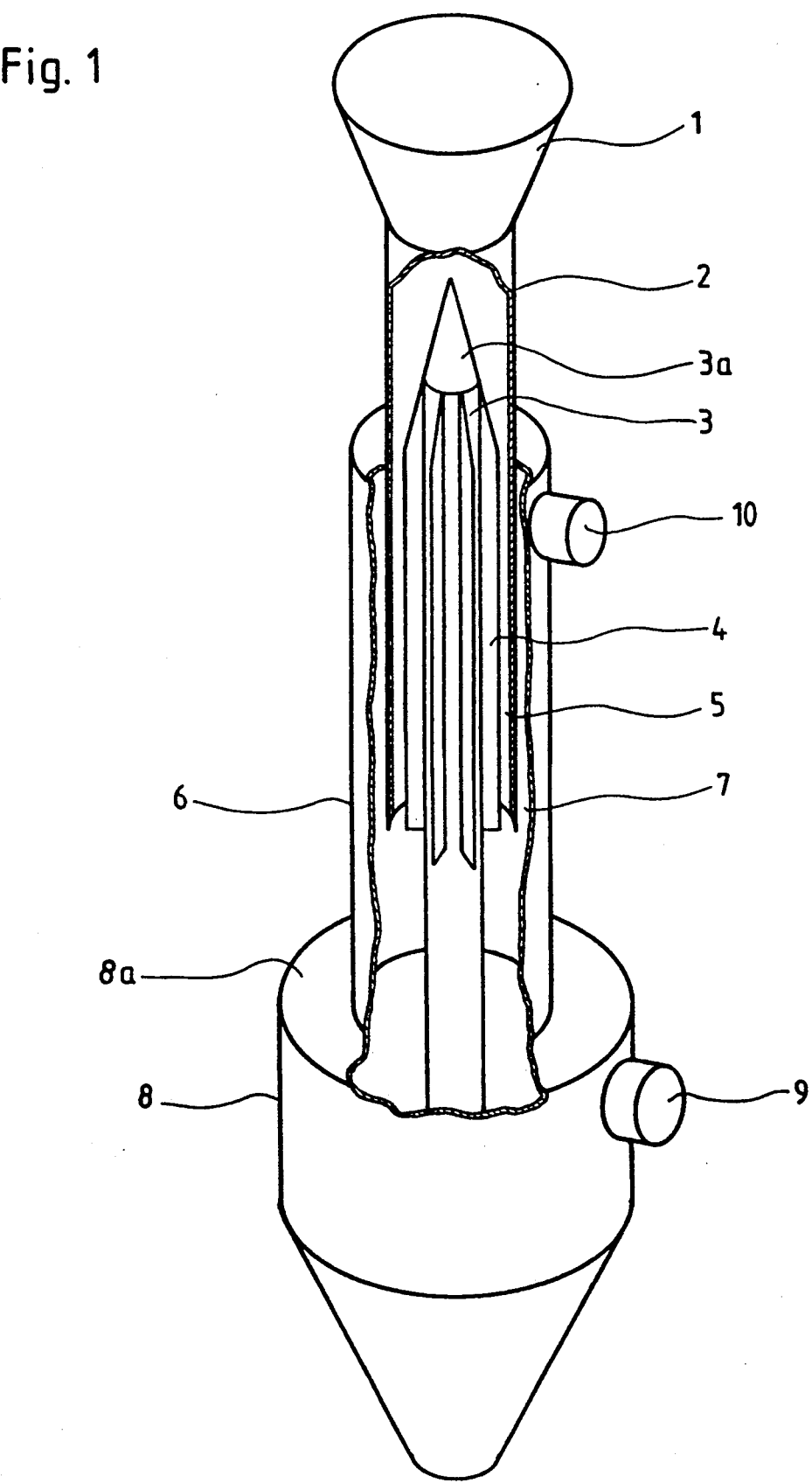
FIG. 1 shows a perspective illustration, partly broken open, of one embodiment of a separator in accordance with the invention.

Throughout all the Figures, the same or corresponding elements are always indicated by the same reference numerals.

Referring now to the drawing and in particular to FIG. 1, there is shown a perspective illustration, partly broken open, of one embodiment of an apparatus for separating contaminants from a stream of bulk material in accordance with the invention. The separator includes an upright pipe section 2 which is connected at its upper end to a hopper 1 through which pneumatically conveyed bulk material is introduced. A displacement body 3 extends inside the pipe section 2 so that an annular space 5 is created between the pipe section 2 and the displacement body 3. The displacement body 3 is provided with a conical tip 3a and includes about its circumference a plurality of evenly spaced axial ribs 4. Each rib 4 has an end face 4a which is bevelled such as to be aligned in flow direction of the descending bulk material and with the conical tip 3a (see also FIG. 2). Suitably, the ribs 4 may consist of sheet metal strips which are welded upon the displacement body 3.

As shown in FIG. 1, the displacement body 3 projects beyond the lower end of the pipe section 2 into a container 8 which receives screened bulk material. The container 8 includes a lateral conduit 9 for supply of sifting air which is fed from a suitable source (not shown) and passes upwards countercurrently to the descending bulk material.

Concentrically surrounding the pipe section 2 is a second pipe section 6 for defining a second annular space 7 between the outside wall of pipe section 2 and the inside wall of pipe section 6. The pipe section 6 extends beyond the lower end of the pipe section 2 and is connected to the lid 8a of the container 8.

At operation, the stream of bulk material and air introduced through the hopper 1 into the pipe section 2 descends and is accelerated in the annular space 5 through provision of the displacement body 3. Sifting air entering the container 8 of the separator through conduit 9 flows upwards to decelerate contaminants in the stream of bulk material exiting the lower end of the first pipe section 2. These contaminants which include lighter components such as dust particles and angel hair are then diverted by the sifting air into the second annular space 7 and discharged through a conduit 10 in proximity of the upper end of the second pipe section 6.

Figure 2:
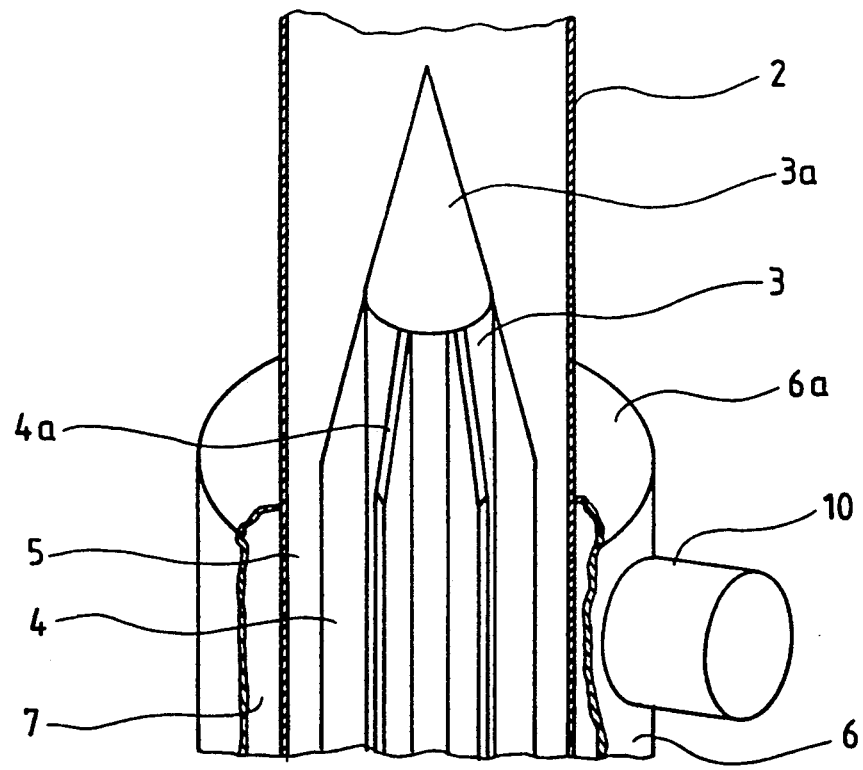
FIG. 2 is a perspective fragmentary illustration of the separator of FIG. 1 on an enlarged scale.

Suitably, the pipe section 6 is closed by a lid 6a, as shown in FIG. 2.

Through the provision of the ribs 4 and their bevelled or slanted end faces 4a, angel hair will primarily deposit at the perimeter-near area of the first annular space 5 so that the distance for angel hair to advance in radial direction in order to enter the second annular space 7 is relatively short compared to the length of the separation zone which begins at the lower end of the pipe section 2. Angel hair which otherwise deposits in the channels defined between the ribs 4 becomes aligned in flow direction so that the chances of being struck by subsequent bulk particles of greater mass and of being entrained through the screening zone into the container 8 are relatively small.

Tests were conducted with separators according to the present invention in which the ribs 4 of the displacement body 3 were spaced from each other by a distance of about 30 mm in circumferential direction and had a height approximately equalling half the clear width of the first annular space 5. These tests showed an improvement of the separation degree of angel hair by a factor 4 compared to conventional separators while still achieving a high degree of separation of dust particles of the bulk material.

Optimal results are attained when designing the ribs 4 of the displacement body 3 in a following manner:

1. The distance of the ribs in circumferential direction should not be smaller than the difference between the radius of the pipe section 2 and the radius of the displacement body 3.
2. The length of the ribs should be about ten to fifteen times the difference between the radius of the pipe section 2 and the radius of the displacement body 3 in order to create a stable, essentially laminar flow.
3. The radial extension of the ribs is dependent upon the maximum grain diameter of granular material to be screened and is selected such that the clear gap width to the inside wall surface of the pipe section 2 is three to four grain diameters in order to avoid a jamming of granular materials in this gap.

While the invention has been illustrated and described as embodied in a separator with displacement body, it is not intended to be limited to the details shown since various modifications and structural changes may be made without departing in any way from the spirit of the present invention.

What is claimed as new and desired to be protected by Letters Patent is set forth in the appended claims.

I claim:

1. A deflection-type separator for bulk material comprising:
   a first upright pipe section through which a stream of bulk material to be screened flows from top to bottom, said first pipe section having a lower end;
   a displacement body having a cone-shaped tip and being concentrically surrounded by said first pipe section for defining a first annular space therebetween which is defined by a clear width, said displacement body being provided with circumferentially spaced radial ribs so as to have a cross section of star-shaped configuration, said ribs having a radial extension substantially equalling half the clear width of said first annular space, with each of said ribs having an end face facing the incoming flow of bulk material and being bevelled such as to be in alignment in flow direction of the bulk material;
   a second pipe section surrounding said first pipe section for defining a second annular space, said second pipe section having a lower end and extending beyond the lower end of said first pipe section; and
   a container connected to the lower end of said second pipe section and receiving screened bulk material, said containers including an inlet for introduction of sifting air which entrains lighter components of descending bulk material and flows through said second annular space to exit at an upper area of said second pipe section.

2. The separator defined in claim 1 wherein said ribs of said displacement body are evenly spaced about the circumference of said displacement body.

3. The separator defined in claim 1 wherein said first pipe section and said displacement body are each defined by a radius, said ribs being defined by root lines which are spaced in circumferential direction of said displacement body by a distance substantially equalling the difference between the radius of said first pipe section and the radius of said displacement body.

4. The separator defined in claim 1 wherein said first pipe section and said displacement body are each defined by a radius, said ribs having a length which is about ten to fifteen times the difference between the radius of said first pipe section and the radius of said displacement, with said ribs extending to about the lower end of said first annular space.

5. The separator defined in claim 1 wherein said first pipe section has an inner wall surface, each of said ribs having a displacement body distant end face which is spaced from said inner wall surface of said first pipe section by a clear gap width which is about three to four times the maximum grain diameter of bulk material to be screened.

6. The separator defined in claim 1 wherein said end faces of said ribs are bevelled such as to be in alignment with said cone-shaped tip of said displacement body.

7. Apparatus for separating contaminants from a stream of bulk material, comprising:
   a first pipe section adapted for allowing downward flow of bulk material to be screened;
   a displacement body extending within said first pipe section and defining with the latter a first annular space, said displacement body including circumferentially spaced radial ribs for providing said displacement body with a cross section of star-shaped configuration and for aligning lighter particles in a parallel relationship with the direction of flow of the bulk material, said ribs being provided with a bevelled end face and including a free edge which extends at a distance to said first pipe section;
   a second pipe section surrounding said first pipe section for defining a second annular space therebetween; and
   a container connected to said second pipe section for collecting screened bulk material, said container including an inlet for supply of air which passes upwards countercurrently to the stream of descending bulk material for entraining the contaminants and diverting them through said second annular space for discharge through an outlet at an upper area of said second pipe section.

* * * * *